United States Patent [19]

Ohyachi et al.

[11] 4,294,732
[45] Oct. 13, 1981

[54] RUBBER MOUNTING COMPOSITIONS

[75] Inventors: Tomio Ohyachi, Akigawa; Koichi Irako, Higashimurayama, both of Japan

[73] Assignee: Bridgestone Tire Company Limited, Tokyo, Japan

[21] Appl. No.: 177,962

[22] Filed: Aug. 14, 1980

[30] Foreign Application Priority Data

Aug. 16, 1979 [JP] Japan .............................. 54/103535
Feb. 15, 1980 [JP] Japan .............................. 55/16541

[51] Int. Cl.³ .................... C08L 93/04; F16M 13/00
[52] U.S. Cl. .................................. 260/27 BB; 260/5; 260/19 UA; 260/24; 260/25; 525/133; 525/139; 248/634
[58] Field of Search ............... 525/133, 139; 260/5, 260/24, 25, 19 UA, 27 BB

[56] References Cited

U.S. PATENT DOCUMENTS 2,813,843  11/1957  Shepard et al. ..................... 525/139
3,300,426  1/1967  Hunsucker ......................... 525/139
3,741,924  6/1973  Okita et al. ....................... 525/133

FOREIGN PATENT DOCUMENTS 524824  5/1956  Canada ............................. 525/133

Primary Examiner—H. S. Cockeram
Attorney, Agent, or Firm—Sughrue, Mion, Zinn, Macpeak & Seas

[57] ABSTRACT

Rubber compositions having excellent vibration isolating properties at a high hardness are produced by compounding 100 parts by weight of at least one of natural rubbers, diene rubbers and diene copolymeric rubbers or a rubber blend of these rubbers and a halogenated butyl rubber, 0.5–35 parts by weight of an oil modified phenol resin, a modified ratio of which is 20% or more, and 2–30 parts by weight based on said resin, of a hardening agent for the phenol resin and hardening the resulting mixture. The use of such rubber compositions is possible to make a rubber mounting to be a small size.

6 Claims, 2 Drawing Figures

RUBBER MOUNTING COMPOSITIONS

BACKGROUND OF THE INVENTION

1. Field of the Invention

The present invention relates to compositions for rubber mountings having excellent vibration isolating properties at a relatively high hardness.

The use of the compositions of the present invention can improve the hardness (static modulus of elasticity) without degrading the vibration isolating properties, so that the rubber compositions according to the present invention are suitable for the material for producing small size and light weight of rubber mountings.

2. Description of the Prior Art

In general, vibration transmissibility $\tau$ is shown by the following equation in a single degree of freedom mounting system in which viscous resistance C and static spring constant k' act to a substance having mass m $$\tau = \sqrt{\frac{1 + l^2}{[1 - (\omega/\omega_0)^2]^2 + l^2}} \quad (1)$$

$\omega = 2\pi f$ is angle frequency, $\omega_0 = \sqrt{k'/m}$ is specific frequency and $l = C\omega/k'$ is loss factor.

The equation (1) approximates to the following equation (2) in a low frequency zone, that is when $\omega$ approximates to $\omega_0$ $$\tau \cong \sqrt{1 + 1/l^2} \quad (2)$$

While, in a high frequency zone, the equation (1) appoximates to the following equation (3).

$$\tau \cong \frac{1 + l}{(\omega/\omega_0)^2 - 1} = \frac{(k' + C\omega)/k'}{(\omega/\omega_0)^2 - 1} \quad (3)$$

$k' + C\omega = k''$ is a dynamic spring constant and $k''/k'$ is a ratio of dynamic-to-static modulus.

From the equations (2) and (3), in order to make the vibration isolating property of the rubber mounting, that is the vibration transmissibility smaller, it is necessary that the loss factor is made higher in a low frequency zone and the ratio of dynamic-to-static modulus is made lower in a high frequency zone.

In the case of rubber mountings for automobiles, as the low frequency zone, about 15 Hz of vibration frequency is considered to be important in order to prevent the bodyshake in view of the vibration isolating design and as the high frequency zone, more than 75 Hz of vibration frequency is considered to be important in order to prevent noise closed in room when running at a high speed.

Within the temperature range wherein the rubber mountings are generally used, that is at a temperature from room temperature to 80° C., the temperature dependency of the dynamic modulus of elasticity and the loss factor shows the negative gradient. Accordingly, in order to satisfy the required properties within the temperature range wherein the rubber mountings are generally used, it is merely necessary that the required properties are satisfied at room temperature side (20° C.) with respect to the ratio of dynamic-to-static modulus and at a high temperature side (80° C.) with respect to the loss factor.

The significance of the present invention will be explained hereinafter in view of the material hardness (static modulus of elasticity) and the vibration isolating properties of the rubber mounting.

Since the rubber mountings are used as a part of automobiles and the like, such a rubber part has been heretofore desired to be small size and light weight, so that the rubber compositions having excellent vibration isolating properties even at a relatively high hardness have been demanded. However, in the prior rubber compositions, if the hardness is increased, the vibration isolating properties have been necessarily degraded. Accordingly, for the portion where the severe vibration isolating properties are desired, such as engine mount (front portion) of automobiles, only ones having a low hardness of no greater than 43° have been provided.

When the hardness of the rubber mountings is low, such a rubber material must be a large size in order to restrain the static displacement when a weight of a member applying vibration is loaded, within a given range, so that in the prior rubber mounting compositions, it has never been attained to obtain ones having a small size and light weight.

SUMMARY OF THE INVENTION

An object of the present invention is to provide rubber compositions having excellent vibration isolating properties even at a relatively high hardness and intends to obtain a small size and light weight of a rubber mounting.

The present invention consists in rubber mounting compositions having excellent vibration isolating properties at a relatively high hardness, which are obtained by compounding 100 parts by weight of at least one of natural rubber, diene rubbers and diene copolymers or a blend rubber of these rubbers with a halogenated butyl rubber, 0.5-35 parts by weight of an oil modified phenol resin (modified ratio: at least 20%) and a vulcanizing agent for the phenol resin of 2-30% by weight based on said phenol resin and vulcanizing the rubber composition.

The hardness of the rubber mounting compositions has been heretofore increased by (1) increasing an amount of carbon black, (2) increasing an amount of sulfur or (3) combining the above processes (1) and (2).

The hardness dependency of the vibration isolating properties of rubber compositions is shown in FIG. 1 and FIG. 2. In FIG. 1 and FIG. 2, the solid line 1 shows a relation of the hardness to the ratio of dynamic-to-static modulus or the loss factor in the case where the hardness is increased by increasing an amount of carbon black as in the above described process 1, the solid line 2 shows a relation of the hardness to the ratio of dynamic-to-static modulus or the loss factor in the case where the hardness is increased by increasing an amount of sulfur as in the above described process 2, the dotted line 3 shows a relation of the hardness to the ratio of dynamic-to-static modulus or the loss factor in the case where the hardness is increased by the above described process 3, and the solid line 4 shows a relation of the hardness to the ratio of dynamic-to-static modulus or the loss factor in the case of the rubber mounting composition according to the present invention. It can be seen from FIG. 1 that the above described process 1 wherein the hardness is increased by increasing the amount of carbon black, noticeably increases the ratio of dynamic-to-static modulus and it can be seen from FIG. 2 that the above described process 2 wherein the hardness is increased by increasing the amount of sulfur, noticeably decreases the loss factor. Furthermore, in the process 2, the flexing fatigue resistance is degraded due to increase of the crosslinking density, so that an amount of sulfur used is limited in order to maintain the commercially satisfactory durability. In the above described process 3 wherein the above described processes 1 and 2 are combined, there is a limitation in order to increase the hardness without degrading the vibration isolating properties as shown in FIG. 1 and FIG. 2 and when this limitation is exceeded, the vibration isolating properties are degraded or the durability is considerably deteriorated.

On the contrary, in the rubber mounting compositions according to the present invention, as shown in the solid line 4 in FIG. 1 and FIG. 2, the hardness can be improved by about 15° (about two times in the static modulus of elasticity) without increasing the ratio of dynamic-to-static modulus in 100 Hz of vibration frequency at 25° C. and decreasing the loss factor in 15 Hz of vibration frequency at 80° C.

DESCRIPTION OF THE PREFERRED EMBODIMENT

Figure 1:
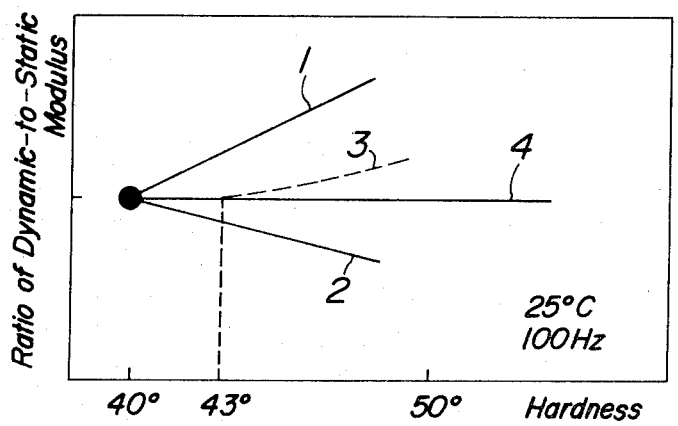
FIG. 1 is curves showing the relation of ratio of dynamic-to-static modulus to hardness of rubber compositions at 25° C., 100 Hz.
Figure 2:
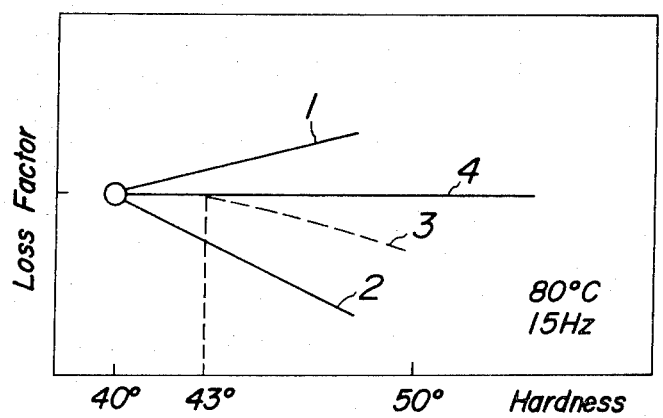
FIG. 2 is curves showing the relation of loss factor to hardness of rubber compositions at 80° C., 15 Hz.

Rubbers to be used in the rubber mounting compositions according to the present invention are at least one of rubbers selected from the group consisting of natural rubber, diene rubbers and diene copolymeric rubbers or a blend rubber of this rubber and a halogenated butyl rubber. As the embodiment, mention may be made of at least one of natural rubber, isoprene rubber, butadiene rubber, styrenebutadiene rubber, styrene-isoprene rubber, butadiene-isoprene rubber and butadiene-pentadiene rubber or blends of these rubbers with halogenated butyl rubbers. As halogenated butyl rubbers, mention may be made of chlorinated butyl rubber, brominated butyl rubber and iodinated butyl rubber and among them, brominated butyl rubber is most preferable.

Among the above described rubbers, the object of the present invention can be attained only by natural rubber, diene rubbers and diene copolymeric rubbers but when a high damping type rubber mounting is obtained, the blend rubbers of these rubbers with the above described halogenated butyl rubber are preferable. A mixture ratio of the halogenated butyl rubber to natural rubber, diene rubber or diene copolymeric rubber is preferred to be 20/80-80/20 (by weight). When the amount of halogenated butyl rubber is less than 20 parts by weight, the effect for obtaining the damping property is low, while when said amount exceeds 80 parts by weight, the operability and the physical properties are degraded.

Oil modified phenol resins to be used together with the above described rubbers are ones obtained by modifying novolak thermoplastic phenol resins (unmodified phenol resins) formed by addition condensation of an excess amount of phenol with aldehyde under a usual acidic catalyst, with a natural oil or a synthetic oil by a well known process. As modifying oils for phenol resins, use may be made of natural oils containing fatty acids, such as linolic acid, linolenic acid, oleic acid, palmitic acid, abietic acid, anacardic acid and the like or resin acids, or synthetic oils similar to these oils, but it is commercially advantageous to use tall oil obtained from pulp waste liquid and cashew oil obtained from cashew nut. The modified phenol resins are produced by simultaneously charging a phenol, an aldehyde and a modifying oil and reacting these substances or dissolving a previously synthesized phenol resin in an appropriate solvent and then adding a modifying oil thereto and reacting these substances and in the present invention anyone of these processes may be used. The modified ratio of the resin is calculated by the following equation.

$$\text{Modified ratio (\%)} \; \frac{\text{Amount of modifying oil charged}}{\text{Amount of phenol charged}} \times 100 \qquad (4)$$

As modified phenol resins, cresol modified phenol resin, cashew modified cresol resin and the like have been known other than the above mentioned modified resins but the use of the modified phenol resins other than the resins of the present invention can not attain the object of the present invention.

The modified ratio of the oil modified phenol resins or the average modified ratio of a mixture of oil modified phenol resin and unmodified phenol resin according to the present invention is limited to 20% or more. In the modified ratio of less than 20%, the ratio of dynamic-to-static modulus increases as compared with the composition not incorporated with the modified phenol resin and such a ratio is not preferable. In particular, when the modification is carried out by using tall oil or cashew oil, the modified ratio is preferred to be more than 30% and more than 40% respectively. If the modified ratio exceeds the above described limited value, the object of the present invention can be attained but even if the modified ratio is made to be more than 100%, the particularly excellent effect can not be obtained and the modifying reaction rather becomes difficult and the modified resin softens and the degree for improving the hardness becomes lower, so that it is desirable that the modified ratio of the resins is not greater than 100%. The mixture ratio of the modified phenol resin or the mixed resin of the modified phenol resin and the unmodified phenol resin is 0.5-35 parts by weight based on 100 parts by weight of rubber. When the mixture ratio of the resin is less than 0.5 part by weight, the effect of compounding the resin is not obtained, while when the mixture ratio exceeds 35 parts by weight, the ratio of dynamic-to-static modulus increases as compared with the composition not incorporated with the modified resin.

In the present invention, 2-30 parts by weight based on the phenol resin, of a hardening agent for phenol resins is used. When an amount of the hardening agent added is less than 2%, the resin is not fully hardened and the ratio of dynamic-to-static modulus becomes higher than that of the composition not incorporated with the resin, while even if said amount is more than 30%, the particular advantage is not recognized and rather the loss factor becomes smaller. As the hardening agent for the phenol resin, use may be made of formaldehyde supplying agents, such as formaldehyde, paraformaldehyde, hexamethylenetetramine and the like and hexamethylenetetramine is generally used.

Furthermore, the rubber mounting compositions may be compounded with usual rubber compounding ingredients, such as zinc white, stearic acid, antioxidant, vulcanization accelerator and the like, if necessary.

The following examples are given for the purpose of illustration of this invention and are not intended as limitations therefo.

In this specification, "hardness" means JIS hardness, "static modulus of elasticity" means static modulus of elasticity at 15% elongation and "ratio of dynamic-to-static modulus" and "loss factor" mean ones measured by a viscoelastic spectrometer (made by Iwamoto Manufacture Co., Ltd.) at 25° C. vibration frequency of 100 Hz and 80° C. vibration frequency of 15 Hz. The samples were produced by press vulcanization at 155° C. for the optimum vulcanizing time with respect to each composition. The amounts of the compounding ingredients mean part by weight.

EXAMPLE 1 porating an unmodified phenol resin and sample No. 6 wherein the hardness was increased by incorporating a modified phenol resin other than the present invention, were increased in the ratio of dynamic-to-static modulus as compared with the blank sample. Only in sample Nos. 7–11 incorporated with the modified resin according to the present invention, the hardness or the static modulus of elasticity was improved without increasing the ratio of dynamic-to-static modulus and decreasing the loss factor as compared with the blank sample, so that the rubber mounting compositions which can noticeably decrease the volume of rubber mounting composed of the blank composition without degrading the vibration isolating properties, can be provided. The rubber mounting compositions having excellent vibration isolating properties in a relatively high hardness level, which have never been heretofore seen, were firstly obtained only by sample Nos. 7–11 wherein the hardness was increased by incorporating the modified resin according to the present invention.

TABLE 1(a)

| Composition | Blank Sample No. 1 | Comparative Example 2 | 3 | 4 | 5 | 6 | Example 7 | 8 | 9 | 10 | 11 |
|---|---|---|---|---|---|---|---|---|---|---|---|
| Natural rubber | 60 | 60 | 60 | 60 | 60 | 60 | 60 | 60 | 60 | 60 | 60 |
| SBR 1500 | 40 | 40 | 40 | 40 | 40 | 40 | 40 | 40 | 40 | 40 | 40 |
| Carbon black | 30 | 50 | 30 | 40 | 30 | 30 | 30 | 30 | 30 | 30 | 30 |
| Naphthenic oil | 15 | 15 | 15 | 15 | 15 | 15 | 15 | 15 | 15 | 15 | 15 |
| Zinc white | 5 | 5 | 5 | 5 | 5 | 5 | 5 | 5 | 5 | 5 | 5 |
| Stearic acid | 1.5 | 1.5 | 1.5 | 1.5 | 1.5 | 1.5 | 1.5 | 1.5 | 1.5 | 1.5 | 1.5 |
| Antioxidant | 1 | 1 | 1 | 1 | 1 | 1 | 1 | 1 | 1 | 1 | 1 |
| Sulfur | 1 | 1 | 2 | 1.5 | 1 | 1 | 1 | 1 | 1 | 1 | 1 |
| Vulcanization accelerator | 1 | 1 | 1 | 1 | 1 | 1 | 1 | 1 | 1 | 1 | 1 |
| Unmodified phenol resin | | | | | 5 | | | | 2 | | |
| Cashew modified cresol resin | | | | | | 5 | | | | | |
| Tall oil modified phenol resin (modified ratio 60%) | | | | | | | 5 | 15 | 4 | | |
| Tall oil modified phenol resin (modified ratio 40%) | | | | | | | | | | 5 | |
| Cashew oil modified phenol resin (modified ratio 50%) | | | | | | | | | | | 5 |
| Hexamethylenetetramine | | | | | 0.75 | 0.75 | 0.75 | 2.25 | 0.9 | 0.75 | 0.75 |

TABLE 1(b)

| Composition | Sample No. | Blank 1 | Comparative Example 2 | 3 | 4 | 5 | 6 | Example 7 | 8 | 9 | 10 | 11 |
|---|---|---|---|---|---|---|---|---|---|---|---|---|
| Results | | | | | | | | | | | | |
| Hardness (°) | | 40 | 53 | 51 | 52 | 47 | 49 | 46 | 52 | 47 | 46 | 47 |
| Static modulus of elasticity (kg/cm$^2$) | | 12.8 | 24.9 | 23.2 | 24.2 | 19.1 | 21.2 | 18.1 | 24.3 | 19.3 | 18.3 | 20.0 |
| Ratio of dynamic-to-static modulus | | 2.54 | 4.05 | 1.97 | 2.83 | 2.91 | 3.00 | 2.52 | 2.53 | 2.52 | 2.53 | 2.54 |
| Loss factor | | 0.140 | 0.218 | 0.084 | 0.134 | 0.156 | 0.139 | 0.142 | 0.153 | 0.148 | 0.146 | 0.153 |

By using rubber consisting of 60 parts of natural rubber and 40 parts of styrene-butadiene rubber (SBR), compositions shown in Table 1 were kneaded by Bunbury mixer and then subjected to press vulcanization at 155° C. to prepare samples. Hardness, static modulus of elasticity, ratio of dynamic-to-static modulus and loss factor were measured with respect to the samples and the obtained results are shown in Table 1. As compared with the dynamic properties of the blank sample No. 1, sample No. 2 in which the hardness was increased by increasing the amount of carbon black, was increased in the ratio of dynamic-to-static modulus, sample No. 3 in which the hardness was increased by increasing the amount of sulfur, was decreased in the loss factor, sample No. 4 wherein amounts of carbon black and sulfur were increased, was increased in the ratio of dynamic-to-static modulus and decreased in the loss factor. Sample No. 5 wherein the hardness was increased by incor-

EXAMPLE 2

Samples were prepared in the same manner as in Example 1 with respect to the composition shown in Table 2 by using 70 parts of SBR and 30 parts of natural rubber as rubber and the measurement was made. In samples Nos. 2–4 of Comparative Examples wherein the hardness was increased by increasing the amount of carbon black or sulfur or incorporating unmodified phenol resin, the ratio of dynamic-to-static modulus was increased or the loss factor was decreased as compared with the blank sample but both the phenomena occured. Only in sample Nos. 5 and 6 according to the present invention wherein the modified resin was compounded, the hardness or the static modulus of elasticity was improved without increasing the ratio of dynamic-tostatic modulus and decreasing the loss factor as compared with the blank sample.

TABLE 2(a)

| Composition | Sample No. | Blank 1 | Comparative Example 2 | 3 | 4 | Example 5 | 6 | 7 |
|---|---|---|---|---|---|---|---|---|
| Natural rubber | | 30 | 30 | 30 | 30 | 30 | 30 | 30 |
| SBR 1500 | | 70 | 70 | 70 | 70 | 70 | 70 | 70 |
| Carbon black | | 30 | 50 | 30 | 30 | 30 | 30 | 30 |
| Naphthenic oil | | 15 | 15 | 15 | 15 | 15 | 15 | 15 |
| Zinc white | | 5 | 5 | 5 | 5 | 5 | 5 | 5 |
| Stearic acid | | 1.5 | 1.5 | 1.5 | 1.5 | 1.5 | 1.5 | 1.5 |
| Antioxidant | | 1 | 1 | 1 | 1 | 1 | 1 | 1 |
| Sulfur | | 1 | 1 | 2 | 1 | 1 | 1 | 1 |
| Vulcanization accelerator | | 1 | 1 | 1 | 1 | 1 | 1 | 1 |
| Unmodified phenol resin | | | | | 8 | | | 2 |
| Tall oil modified phenol resin (modified ratio 60%) | | | | | | 8 | | |
| Cashew oil modified phenol resin (modified ratio 60%) | | | | | | | 8 | 6 |
| Hexamethylenetetramine | | | | | 1.2 | 1.2 | 1.2 | 1.2 |

TABLE 2(b)

| Composition | Sample No. | Blank 1 | Comparative Example 2 | 3 | 4 | Example 5 | 6 | 7 |
|---|---|---|---|---|---|---|---|---|
| Results | | | | | | | | |
| Hardness (°) | | 41 | 51 | 47 | 49 | 48 | 50 | 50 |
| Static modulus of elasticity (kg/cm$^2$) | | 13.5 | 21.2 | 19.0 | 19.7 | 18.5 | 21.3 | 21.7 |
| Ratio of dynamic-to-static modulus | | 3.27 | 4.71 | 2.29 | 3.89 | 3.24 | 3.26 | 3.27 |
| Loss factor | | 0.171 | 0.240 | 0.118 | 0.185 | 0.173 | 0.175 | 0.176 |

EXAMPLE 3

In this example, 60 parts of natural rubber and 55 parts of oil extended SBR produced by emulsion polymerization or solution polymerization were used as rubber. Samples were prepared in the composition shown in Table 3 in the same manner as in Example 1. In sample Nos. 4, 5 and 6 of the present invention, the hardness or the static modulus of elasticity was increased without increasing or decreasing the ratio of dynamic-to-static modulus and the loss factor as compared with the corresponding blank sample Nos. 1, 2 and 3 respectively. In particular, the sample Nos. 4 and 5, wherein oil modified phenol resin and oil extended SBR were incorporated, the ratio of dynamic-to-static modulus was not increased but was broadly decreased and the very excellent rubber mounting compositions having higher hardness which has never been found, were obtained.

TABLE 3(a)

| Composition | Sample No. | Blank 1 | 2 | 3 | Example 4 | 5 | 6 |
|---|---|---|---|---|---|---|---|
| Natural rubber | | 60 | 60 | 60 | 60 | 60 | 60 |
| SBR 1712 | | 55 | | | 55 | | |
| Solprene 375 | | | 55 | | | 55 | |
| Solprene 380 | | | | 55 | | | 55 |
| Carbon black | | 35 | 35 | 35 | 35 | 35 | 35 |
| Zinc white | | 5 | 5 | 5 | 5 | 5 | 5 |

TABLE 3(a)-continued

| Composition | Sample No. | Blank 1 | 2 | 3 | Example 4 | 5 | 6 |
|---|---|---|---|---|---|---|---|
| Stearic acid | | 1.5 | 1.5 | 1.5 | 1.5 | 1.5 | 1.5 |
| Antioxidant | | 1 | 1 | 1 | 1 | 1 | 1 |
| Sulfur | | 1.3 | 1.3 | 1.3 | 1.3 | 1.3 | 1.3 |
| Vulcanization accelerator | | 1 | 1 | 1 | 1 | 1 | 1 |
| Tall oil modified phenol resin (modified ratio 60%) | | | | | 6 | 6 | |
| Cashew oil modified phenol resin (modified ratio 60%) | | | | | | | 6 |
| Hexamethylenetetramine | | | | | 1 | 1 | 1 |

TABLE 3(b)

| Composition | Sample No. | Blank 1 | 2 | 3 | Example 4 | 5 | 6 |
|---|---|---|---|---|---|---|---|
| Results | | | | | | | |
| Hardness (°) | | 47 | 47 | 47 | 55 | 56 | 55 |
| Static modulus of elasticity (kg/cm$^2$) | | 19.1 | 20.2 | 19.6 | 27.7 | 31.5 | 28.8 |
| Ratio of dynamic-to-static modulus | | 2.67 | 2.22 | 2.49 | 1.78 | 1.87 | 2.46 |
| Loss factor | | 0.135 | 0.108 | 0.126 | 0.140 | 0.114 | 0.131 |

EXAMPLE 4

Samples were prepared by using a rubber blend consisting of 70 parts of two rubbers among natural rubber, isoprene rubber and butadiene rubber and 30 parts of SBR as rubber in the composition shown in Table 4 in the same manner as described in Example 1 and the measurement was made. In sample Nos. 4, 5 and 6, the hardness or the static modulus of elasticity was increased respectively without deteriorating the ratio of dynamic-to-static modulus and the loss factor as compared with the corresponding blank sample Nos. 1, 2, and 3.

TABLE 4(a)

| Composition | Sample No. | Blank 1 | Blank 2 | 3 | Example 4 | 5 | 6 |
|---|---|---|---|---|---|---|---|
| Natural rubber | | 40 | 40 | | 40 | 40 | |
| IR 2200 | | 30 | | 40 | 30 | | 40 |
| BR 01 | | | 30 | 30 | | 30 | 30 |
| SBR 1500 | | 30 | 30 | 30 | 30 | 30 | 30 |
| Carbon black | | 35 | 35 | 35 | 35 | 35 | 35 |
| Naphthenic oil | | 15 | 15 | 15 | 15 | 15 | 15 |
| Zinc white | | 5 | 5 | 5 | 5 | 5 | 5 |
| Stearic acid | | 1.5 | 1.5 | 1.5 | 1.5 | 1.5 | 1.5 |
| Antioxidant | | 1 | 1 | 1 | 1 | 1 | 1 |
| Sulfur | | 1.3 | 1.3 | 1.3 | 1.3 | 1.3 | 1.3 |
| Vulcanization accelerator | | 1 | 1 | 1 | 1 | 1 | 1 |
| Tall oil modified phenol resin (modified ratio 60%) | | | | | 6 | 6 | 6 |
| Hexamethylenetetramine | | | | | 1 | 1 | 1 |

TABLE 4(b)

| Composition | Sample No. | Blank 1 | Blank 2 | 3 | Example 4 | 5 | 6 |
|---|---|---|---|---|---|---|---|
| Results | | | | | | | |
| Hardness (°) | | 45 | 45 | 45 | 53 | 53 | 53 |
| Static modulus of elasticity (kg/cm$^2$) | | 18.2 | 18.1 | 19.4 | 27.0 | 26.5 | 27.5 |
| Ratio of dynamic-to-static modulus | | 2.48 | 2.47 | 2.51 | 2.41 | 2.46 | 2.01 |
| Loss factor | | 0.128 | 0.127 | 0.131 | 0.128 | 0.131 | 0.131 |

EXAMPLE 5

The compounding ingredients as shown in Table 5 were kneaded by using a rubber blend consisting of 40 parts of natural rubber and 60 parts of brominated butyl rubber (Trade name: Polysarboromobutyl X2, made by Polysar Co., Ltd.) by means of Bunbury mixer and then vulcanized by press at 150° C. to prepare samples.

The hardness, static modulus of elasticity, ratio of dynamic-to-static modulus and loss factor were measured with respect to the samples and the obtained results are shown in Table 5.

As compared with the blank sample No. 1, sample No. 2, in which the hardness was increased by increasing the amount of carbon black, was considerably increased in the ratio of dynamic-to-static modulus, sample No. 3 in which the hardness was increased by increasing the amount of sulfur, was considerably decreased in the loss factor, sample No. 4 wherein amounts of carbon black and sulfur were increased, was increased in the ratio of dynamic-to-static modulus and decreased in the loss factor. Sample No. 5 wherein the hardness was increased by incorporating a modified phenol resin other than the present invention, was increased in the ratio of dynamic-to-static modulus as compared with the blank sample.

On the contrary, in sample Nos. 6–8 incorporated with modified phenol resin according to the present invention, the hardness or the static modulus of elasticity was greatly improved without increasing the ratio of dynamic-to-static modulus and decreasing the loss factor as compared with the blank sample. Namely, the rubber mounting compositions having excellent vibration isolating properties which have never been found in the high hardness, were obtained.

TABLE 5(a)

| Composition | Sample No. | Blank 1 | Comparative Example 2 | 3 | 4 | 5 | Example 6 | 7 | 8 |
|---|---|---|---|---|---|---|---|---|---|
| Natural rubber | | 40 | 40 | 40 | 40 | 40 | 40 | 40 | 40 |
| Polysarbromobutyl X2 | | 60 | 60 | 60 | 60 | 60 | 60 | 60 | 60 |
| Carbon black | | 35 | 55 | 35 | 45 | 35 | 35 | 35 | 35 |
| Aromatic oil | | 15 | 15 | 15 | 15 | 15 | 15 | 15 | 15 |
| Stearic acid | | 1.5 | 1.5 | 1.5 | 1.5 | 1.5 | 1.5 | 1.5 | 1.5 |
| Antioxidant | | 2 | 2 | 2 | 2 | 2 | 2 | 2 | 2 |
| Paraffin wax | | 1 | 1 | 1 | 1 | 1 | 1 | 1 | 1 |
| Zinc white | | 3 | 3 | 3 | 3 | 3 | 3 | 3 | 3 |
| Sulfur | | 1.2 | 1.2 | 2.0 | 1.6 | 1.2 | 1.2 | 1.2 | 1.2 |
| Vulcanization accelerator *1 | | 0.75 | 0.75 | 0.75 | 0.75 | 0.75 | 0.75 | 0.75 | 0.75 |
| Vulcanization accelerator *2 | | 0.5 | 0.5 | 0.5 | 0.5 | 0.5 | 0.5 | 0.5 | 0.5 |
| Cashew oil modified cresol resin (modified ratio 60%) | | | | | | 5 | | | |
| Tall oil modified phenol resin (modified ration 60%) | | | | | | | 5 | 15 | |
| Cashew oil modified phenol resin (modified ratio 60%) | | | | | | | | | 5 |
| Hexamethylenetetramine | | | | | | 0.8 | 0.8 | 2.3 | 0.8 |

*1 NOBS: N-oxydiethylene benzothiazyl-2-sulfeneamide
*2 TT: tetramethylthiuram disulfide

TABLE 5(b)

| Composition | Sample No. | Blank 1 | Comparative Example 2 | 3 | 4 | 5 | Example 6 | 7 | 8 |
|---|---|---|---|---|---|---|---|---|---|
| Results | | | | | | | | | |
| Hardness (°) | | 42 | 56 | 48 | 53 | 54 | 51 | 62 | 55 |
| Static modulus of elasticity (kg/cm$^2$) | | 17.1 | 27.9 | 19.3 | 24.6 | 27.4 | 25.0 | 40.2 | 28.3 |
| Ratio of dynamic-to-static modulus | | 2.96 | 4.00 | 2.93 | 3.35 | 3.26 | 2.92 | 2.95 | 2.94 |

TABLE 5(b)-continued

| Composition | Sample No. | Blank 1 | Comparative Example 2 | 3 | 4 | 5 | Example 6 | 7 | 8 |
|---|---|---|---|---|---|---|---|---|---|
| Loss factor | | 0.109 | 0.140 | 0.083 | 0.094 | 0.108 | 0.112 | 0.118 | 0.114 |

What is claimed is:

1. Rubber mounting compositions having excellent vibration isolating properties at a relatively high hardness obtained by compounding 100 parts by weight of at least one of natural rubber, diene rubbers and diene copolymeric rubbers or a rubber blend of these rubbers and a halogenated butyl rubber, 0.5–35 parts by weight of an oil modified phenol resin selected from the group consisting of tall oil modified phenol resin and cashew oil modified phenol resin, a modified ratio of said tall oil being 30% or more, and 2–30 parts by weight based on said resin, of a hardening agent for the phenol resin and hardening the resulting mixture.

2. Rubber mounting compositions as claimed in claim 1, wherein the halogenated butyl rubber is brominated butyl rubber.

3. Rubber mounting compositions as claimed in claim 1, wherein the halogenated butyl rubber and at least one of natural rubber, diene rubber and diene copolymeric rubbers are mixed in a weight ratio of 20/80–80/20.

4. Rubber mounting compositions as claimed in claim 1, wherein the oil modified phenol resin is a mixture of an unmodified phenol resin and said oil modified phenol resins, an average modified ratio of said mixture being 30% or more.

5. Rubber mounting compositions as claimed in claim 1, wherein the modified ratio of the cashew oil modified phenol resin is more than 40%.

6. Rubber mounting compositions as claimed in claim 1, wherein the hardening agent is hexamethylenetetramine.

* * * * *